US009369975B2

(12) United States Patent
Kim

(10) Patent No.: US 9,369,975 B2
(45) Date of Patent: Jun. 14, 2016

(54) APPARATUS FOR CONFIGURING RADIO ACCESS OVERLAY BROADCAST NETWORK

(71) Applicant: ELECTRONICS AND TELECOMMUNICATIONS RESEARCH INSTITUTE, Daejeon-si (KR)

(72) Inventor: Young-Il Kim, Daejeon (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 473 days.

(21) Appl. No.: 13/788,767

(22) Filed: Mar. 7, 2013

(65) Prior Publication Data

US 2013/0237143 A1 Sep. 12, 2013

(30) Foreign Application Priority Data

Mar. 9, 2012 (KR) .......................... 10-2012-0024572

(51) Int. Cl.
*H04W 56/00* (2009.01)
*H04W 4/06* (2009.01)
*H04W 76/00* (2009.01)

(52) U.S. Cl.
CPC ................ *H04W 56/00* (2013.01); *H04W 4/06* (2013.01); *H04W 76/002* (2013.01)

(58) Field of Classification Search
CPC .................................. H04W 4/06; H04W 4/02
See application file for complete search history.

(56) References Cited

U.S. PATENT DOCUMENTS

| 7,596,385 | B2 * | 9/2009 | Aghvami ............. | H04L 12/5695 455/168.1 |
| 8,811,405 | B2 * | 8/2014 | Park .................... | H04L 12/1886 370/395.21 |
| 2003/0088696 | A1 * | 5/2003 | McCanne ........... | H04L 12/1836 709/238 |
| 2006/0004643 | A1 * | 1/2006 | Stadelmann ........... | G06Q 30/04 705/34 |
| 2006/0050672 | A1 * | 3/2006 | Shim .................... | H04L 12/189 370/338 |

(Continued)

FOREIGN PATENT DOCUMENTS

KR 1020110065307 A 6/2011

*Primary Examiner* — Bobbak Safaipour
(74) *Attorney, Agent, or Firm* — Ladas & Parry LLP

(57) ABSTRACT

An apparatus for configuring an overlay broadcast network is provided. The apparatus includes: an overlay broadcast server that receives broadcast contents information from a contents server, receives traffic information from a plurality of heterogeneous radio access network, and configures an overlay broadcast network by overlaying the plurality of heterogeneous radio access networks based on the broadcast contents information and the traffic information. The present invention can secure a technology for distributing the load distribution of traffic, securing the broadcast quality by reducing the interference signals, transmitting the multi-screen contents by configuring the overlay broadcast network integrating and using each radio access network under the environment in which various radio access networks are present, increase the frequency use efficiency of the overall radio access network, and save the broadcast communication costs of the user due to the introduction of a virtual mobile communication network provider.

15 Claims, 6 Drawing Sheets

(56) References Cited

U.S. PATENT DOCUMENTS

| | | | |
|---|---|---|---|
| 2006/0166699 A1* | 7/2006 | Aghvami | H04L 12/5695 455/552.1 |
| 2006/0206610 A1* | 9/2006 | Ling | H04W 4/02 709/226 |
| 2008/0311902 A1* | 12/2008 | Diepstraten | H04W 72/005 455/426.1 |
| 2009/0245133 A1* | 10/2009 | Gupta | H04W 48/14 370/254 |
| 2009/0291631 A1* | 11/2009 | Xue | H04L 12/1836 455/3.01 |
| 2010/0138494 A1* | 6/2010 | Lee | G06Q 30/02 709/204 |
| 2011/0044337 A1* | 2/2011 | Park | H04L 12/1886 370/390 |
| 2011/0149909 A1* | 6/2011 | An | H04L 47/10 370/331 |
| 2012/0066717 A1* | 3/2012 | Park | H04W 12/06 725/39 |
| 2012/0113839 A1* | 5/2012 | Etemad | H04B 7/024 370/252 |
| 2012/0114121 A1* | 5/2012 | Jung | H04N 21/26613 380/242 |
| 2012/0163427 A1* | 6/2012 | Kim | H04N 21/234327 375/219 |
| 2012/0188878 A1* | 7/2012 | Simon | H04W 4/06 370/241 |
| 2012/0236717 A1* | 9/2012 | Saska | H04W 48/02 370/235 |
| 2013/0157653 A1* | 6/2013 | Huang | H04W 28/0215 455/423 |
| 2013/0215770 A1* | 8/2013 | Kim | H04W 48/18 370/252 |
| 2013/0346566 A1* | 12/2013 | Kwon | H04N 21/4622 709/219 |
| 2014/0269598 A1* | 9/2014 | Lunden | H04W 72/1215 370/329 |

* cited by examiner

APPARATUS FOR CONFIGURING RADIO ACCESS OVERLAY BROADCAST NETWORK

CROSS-REFERENCE TO RELATED APPLICATIONS

This application claims the benefit of priority Korean Patent Application No. 10-2012-0024572 filed on Mar. 9, 2012, all of which are incorporated by reference in their entirety herein.

BACKGROUND OF THE INVENTION

1. Field of the invention

The present invention relates to an overlay broadcast network, and more particularly, to an apparatus configuring a radio access overlay broadcast network.

2. Related Art

As the demand for a multimedia contents service is increased, various radio access networks capable of providing high speed traffic have been introduced In addition, an overlay broadcast network can be configured through a multi radio access network using a multi radio access technology (RAT) terminal capable of accessing a multi radio access network. That is, when radio traffic environment of a single radio access network is poor, a network can be effectively operated through traffic loads between heterogeneous networks.

However, in order to reduce interference between adjacent cells in a mobile internet protocol TV network, it is difficult to promote efficiency in terms of the use of radio resources by applying a scheme that sets a broadcast region by integrating several cells and simultaneously transmits the same contents to all the base stations belonging to a broadcast network region.

Therefore, a need exists for a method of configuring the broadcast network through the heterogeneous radio access network, securing synchronization of contents, and transmitting the contents in consideration of characteristics of heterogeneous network.

SUMMARY OF THE INVENTION

The present invention provides a method and an apparatus for configuring a radio access overlay broadcast network.

The present invention also provides a method and an apparatus for securing synchronization of contents and transmitting the contents in a radio access overlay broadcast network.

In an aspect, there is provided an apparatus for configuring overlay broadcast network, including: an overlay broadcast server that receives broadcast contents information from a contents server, receives traffic information from a plurality of heterogeneous radio access network, and configures an overlay broadcast network by overlaying the plurality of heterogeneous radio access networks based on the broadcast contents information and the traffic information.

The overlay broadcast server may transmit the broadcast contents information to a terminal through the overlay broadcast network by controlling a router.

The traffic information may include at least one of radio resource allocation information, available radio resource information, and interference information.

The plurality of heterogeneous radio access networks may be configured of a combination of all or a part of a $3^{rd}$ Generation Partnership Project/Long Term Evolution (3GPP/LTE) network, a Wibro/Mobile WiMax network, an IMT-Advanced Wibro network, and a WiFi network.

A size of a cell of the overlay broadcast network may be dynamically changed.

The overlay broadcast server may include a contents synchronization frame generator that adds synchronization signals so as to simultaneously transmit the broadcast contents information in each radio access network configuring the overlay broadcast network.

The overlay broadcast server may include a broadcast contents divider that divides the broadcast contents information in the least common multiple unit of each radio access network configuring the overlay broadcast network.

The overlay broadcast server may transmit the divided broadcast contents information to a terminal through the overlay broadcast network.

The overlay broadcast server may include a transcoder that performs transcoding when a transmission rate of broadcast contents required in a terminal and a transmission rate provided from the radio access network selected by the terminal are different from each other.

In another aspect, there is provided a method for broadcasting contents in a radio access network, including: configuring an overlay broadcast network by overlaying all or a part of a plurality of heterogeneous radio access networks based on broadcast contents information received from a contents server and traffic information received from the plurality of heterogeneous radio access networks; and broadcasting the contents information to a terminal through the overlay broadcast network.

The broadcast contents information may be divided and transmitted in the least common multiple unit of transmission frames of the plurality of heterogeneous radio access networks.

The method may further include: comparing an allowable bandwidth of the plurality of heterogeneous radio access networks with a required bandwidth of contents required by the terminal, wherein the broadcast contents information is transmitted by performing transcoding when the allowable bandwidth of the plurality of heterogeneous radio access networks is smaller than a required bandwidth of contents required by the terminal.

A size of a cell of the overlay broadcast network may be dynamically changed.

The plurality of heterogeneous radio access networks may be configured of a combination of all or a part of a $3^{rd}$ Generation Partnership Project/Long Term Evolution (3GPP/LTE) network, an IMT-Advanced Wibro network, and a WiFi network.

In another aspect, there is provided an overlay broadcast network system, including: a plurality of heterogeneous radio access networks that are configured of a combination of all or a part of a $3^{rd}$ Generation Partnership Project/Long Term Evolution (3GPP/LTE) network, a Wibro/Mobile WiMax network, an IMT-Advanced Wibro network, and a WiFi network; and an overlay broadcast server that receives broadcast contents information from a contents server, receives traffic information from the plurality of heterogeneous radio access network, and configures an overlay broadcast network by overlaying the plurality of heterogeneous radio access networks based on the broadcast contents information and the traffic information.

DESCRIPTION OF EXEMPLARY EMBODIMENTS

Figure 1:
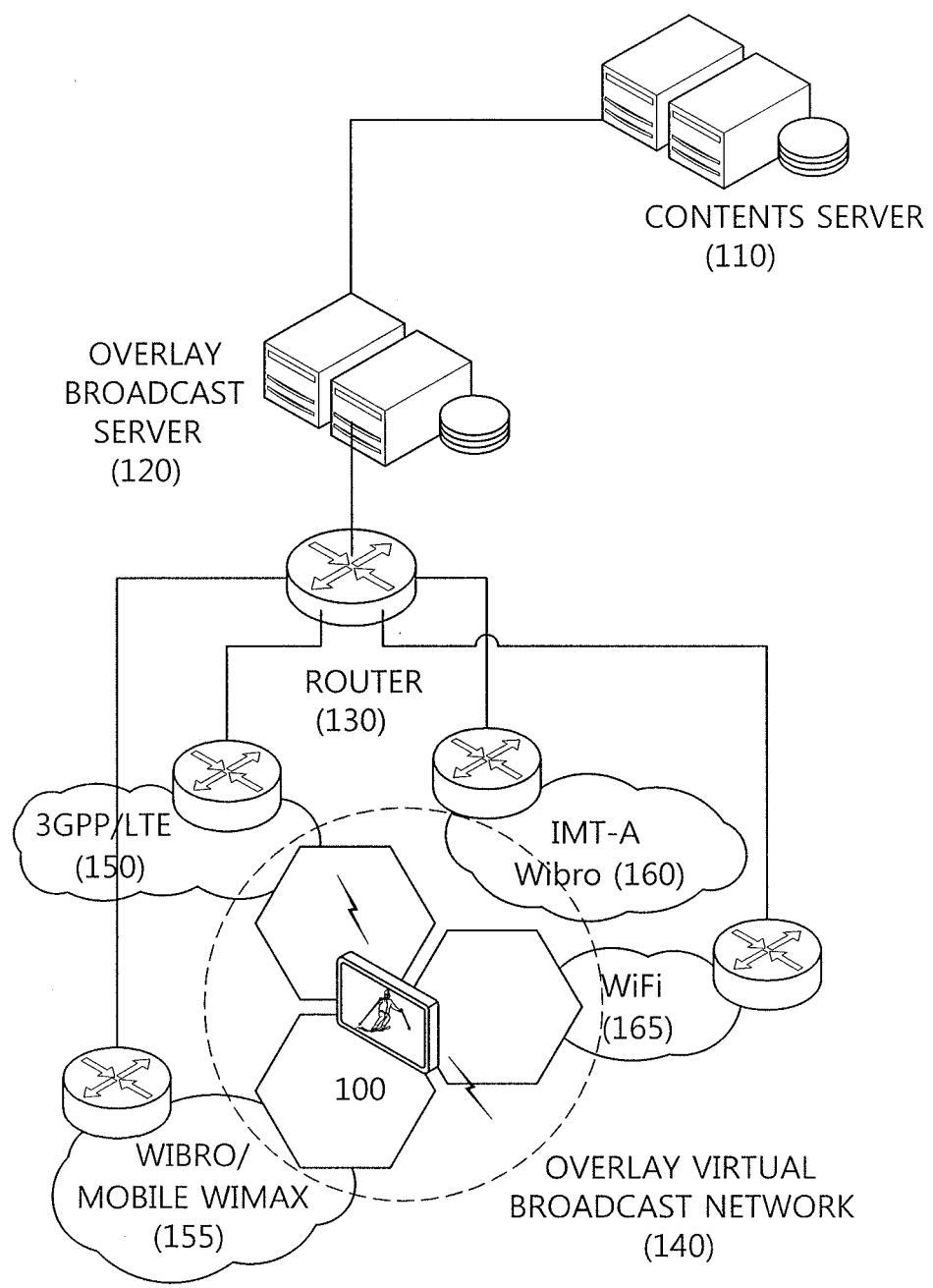
FIG. 1 is a diagram showing an example of a configuration of an overlay broadcast network according to an exemplary embodiment of the present invention.

Hereinafter, exemplary embodiments of the present invention will be described in detail with reference to the accompanying drawings so that those skilled in the art may easily practice the present invention. However, the present invention may be implemented in various ways and is not limited to the exemplary embodiments described herein. Further, throughout the drawings, the same or similar reference numerals will be used to designate the same components or like components having the same functions in the scope of the similar idea.

FIG. 1 is a diagram showing an example of a configuration of an overlay broadcast network according to an exemplary embodiment of the present invention.

Referring to FIG. 1, an overlay broadcast network includes a user terminal 100, a contents server 110, an overlay broadcast server 120, a router 130, and various radio access networks 150, 155, 160, and 165.

The content server 110 transmits a variety of contents information or contents information required by a terminal, and other contents related additional information to the overlay broadcast server 120.

The overlay broadcast server 120 configures the overlay broadcast network based on traffic information (for example, radio resource allocation information, available radio resource information, interference information, and the like) and broadcast contents information (for example, broadcast programs) that are periodically or aperiodically provided from various radio access networks 150, 155, 160, and 165. A size of the cell of the overlay broadcast network may be dynamically changed and a type of the radio access networks may also be changed.

In addition, the overlay broadcast server 120 transmits the broadcast contents to the terminal 100 through the overlay broadcast network by controlling the router 130.

Various radio access networks may be a $3^{rd}$ Generation Partnership Project/Long Term Evolution (3GPP/LTE) 150 network, a Wibro/Mobile WiMax 155 network, an IMT-Advanced Wibro 160 network, or a WiFi 165 network. Various radio access networks may be a combination of different types of networks and may include a plurality of homogeneous networks.

The overlay virtual broadcast network 140 may be configured as a set of a plurality of radio access networks.

However, when configuring a multicast broadcast service (MBS) zone in order to reduce the interference of the adjacent cells in configuring the mobile IPTV broadcast network, interference may occur in a boundary area of the cells and therefore, base stations within the MBS zone transmit the same contents at the same symbol and has degraded flexibility due to a limitation in managing radio resources of all the base stations in a packet scheduler.

Figure 2:
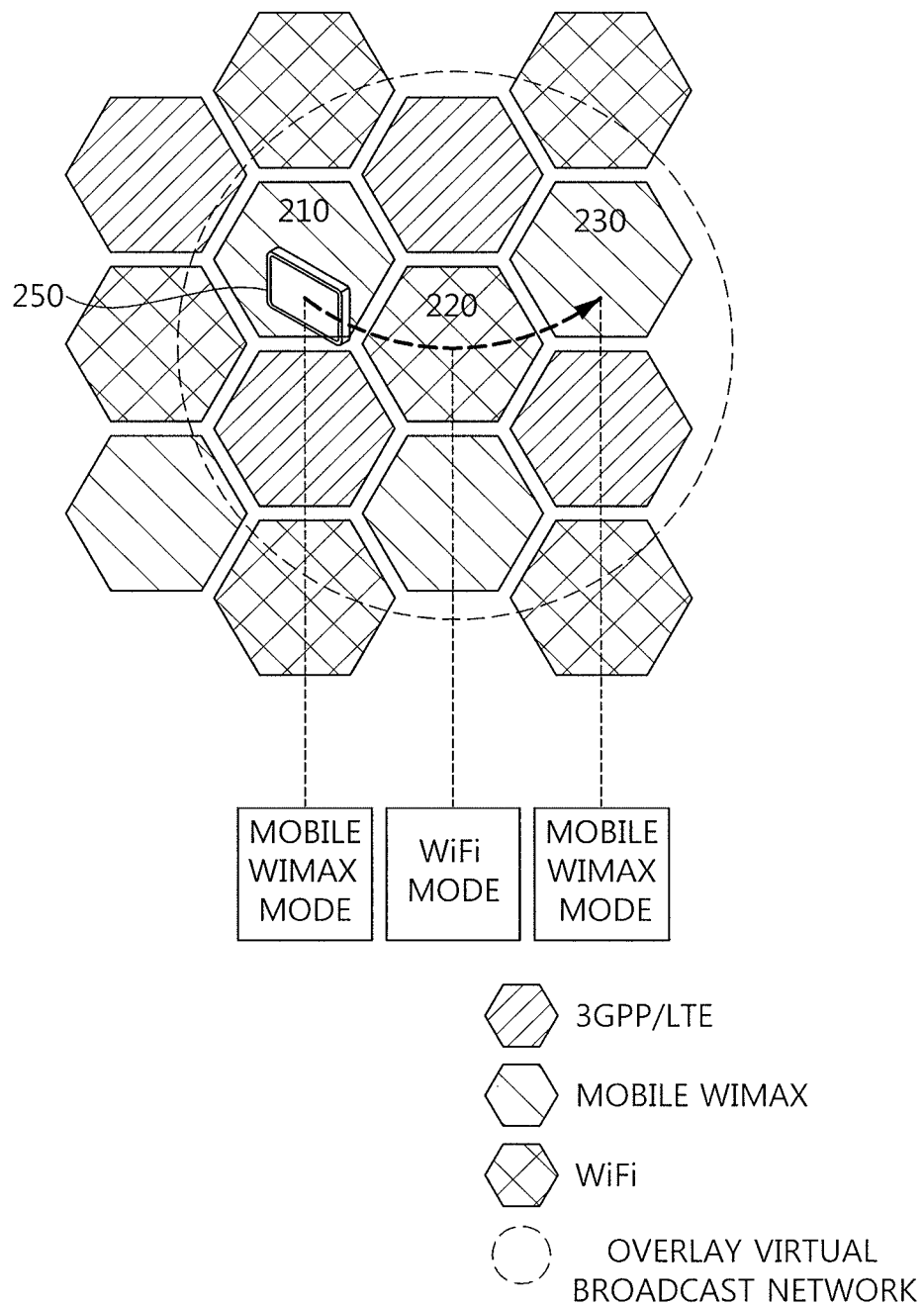
FIG. 2 is a diagram showing a change in a receiving mode according to a movement of a terminal within the overlay broadcast network according to the exemplary embodiment of the present invention.

FIG. 2 is a diagram showing a change in a receiving mode according to a movement of a terminal within the overlay broadcast network according to the exemplary embodiment of the present invention.

Referring to FIG. 2, the overlay broadcast network is configured by overlaying a plurality of radio access networks according to the exemplary embodiment of the present invention. The overlay broadcast network can manage the efficient radio resources by removing inter-cell interference and provide high-quality broadcast services.

A terminal 250 moves from a mobile WiMax base station 210 to a mobile WiMax base station 230 via a WiFi base station 220. In this case, the mobile WiMax base station 210 and the mobile WiMax base station 230 do not have to transmit the same contents at the same symbol due to the exclusion of the interference signal and provides synchronization at a frame level. Therefore, the mobile IPTV service quality is generally improved by flexibly using the radio resources.

Figure 3:
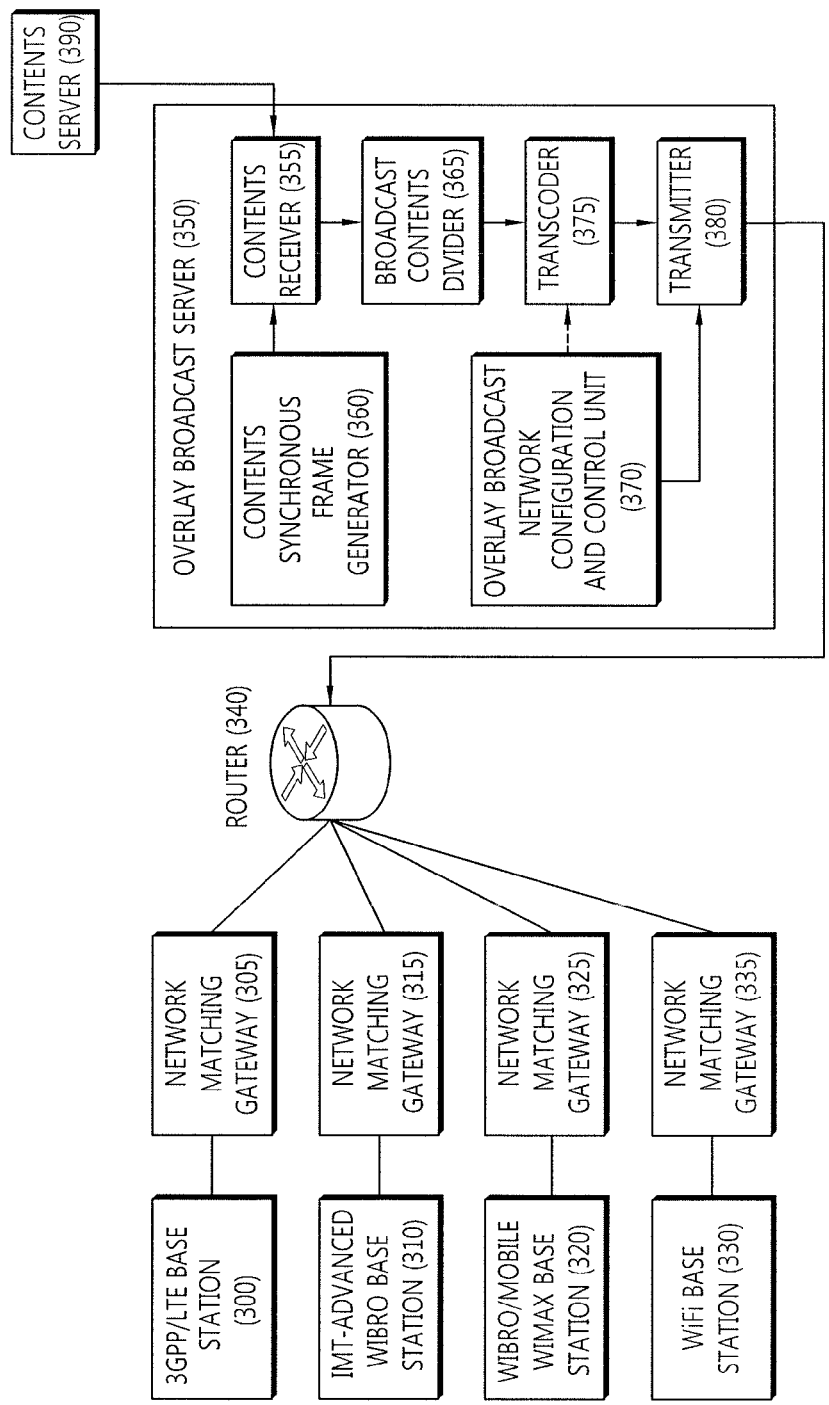
FIG. 3 is an example showing a configuration of an overlay broadcast network (or broadcast network) system according to the exemplary embodiment of the present invention.

FIG. 3 is an example showing a configuration of an overlay broadcast network (or broadcast network) system according to the exemplary embodiment of the present invention.

Referring to FIG. 3, a heterogeneous radio access network may be configured of a combination of a 3GPP/LTE base station 300, an IMT-Advanced Wibro base station 310, a Wibro/mobile WiMax base station 320, a WiFi base station 330, and the like. In this case, it is possible to configure a dynamic overlay broadcast network. Each base station of the heterogeneous radio access network is connected with a router 340 through network matching gateways 305, 315, 325, and 335.

The overlay broadcast network interlocks with an overlay broadcast server 350 and a contents server 390 through the router 340.

The overlay broadcast server 350 receives broadcast contents and broadcast related information from the contents server 390 through a contents receiving unit 355.

A contents synchronization frame generator 360 adds synchronization signals so as to transmit the same broadcast contents through the overlay broadcast network.

A broadcast contents divider 365 divides the broadcast contents in the least common multiple unit of a transmission frame of each radio access network. This is to dynamically provide the broadcast contents independently of the change of the radio access network in the terminal and the overlay broadcast server.

An overlay broadcast network configuration and control unit 370 configures and controls the overlay broadcast network over the heterogeneous radio access network.

A transcoder 375 performs transcoding when a transmission rate of the broadcast contents required in the terminal and a transmission rate that can be provided from the selected radio access network are different from each other.

A transmitter 380 transmits contents such as broadcast programs through the overlay broadcast network via the router 340.

Figure 4:
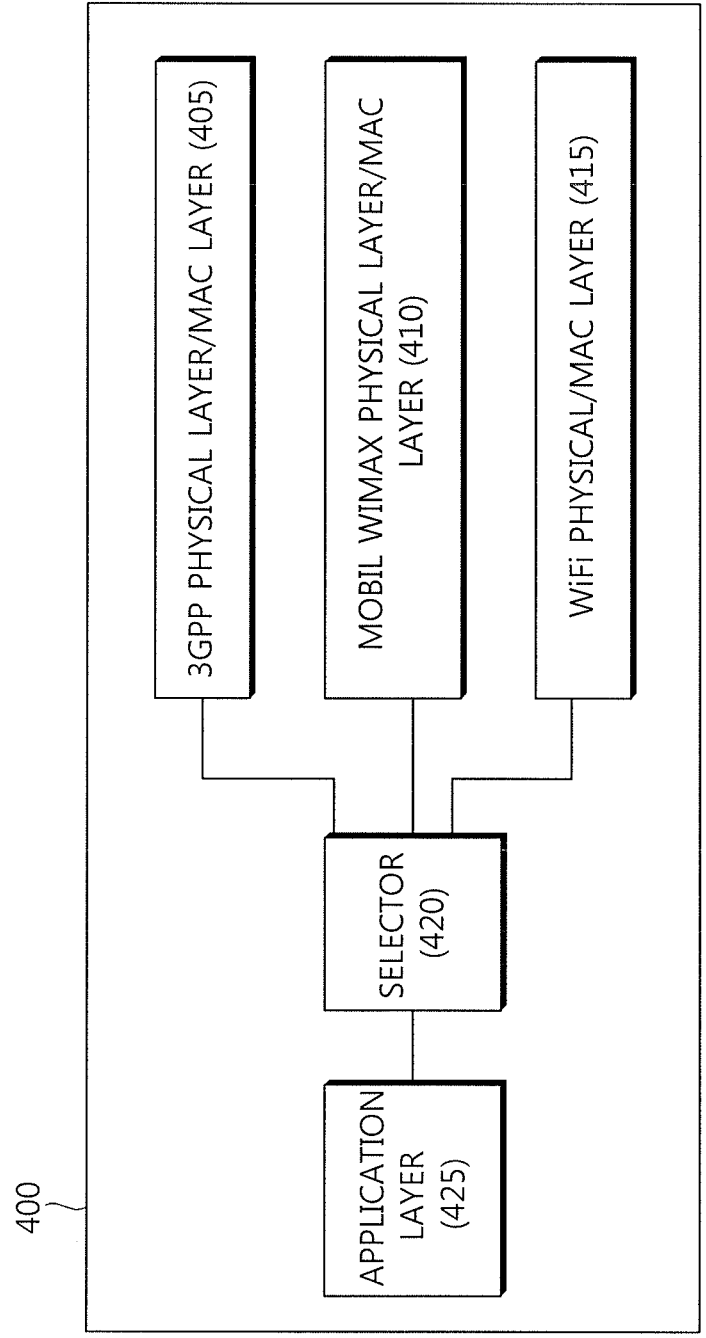
FIG. 4 is a diagram showing an example of a configuration of a terminal configuring the overlay broadcast network according to the exemplary embodiment of the present invention.

FIG. 4 is a diagram showing an example of a configuration of a terminal configuring the overlay broadcast network according to the exemplary embodiment of the present invention. The terminal may be a multi mode terminal.

Referring to FIG. 4, a terminal 400 includes physical and media access control hierarchical layers that can access the heterogeneous radio access network, for example, a 3GPP physical layer/MAC layer 405, a mobile WiMax physical layer/MAC layer 410, or a WiFi physical layer/MAC layer 415.

The terminal 400 includes a selector 420 that can select and use the physical layer/MAC layer and an application layer 425.

Figure 5:
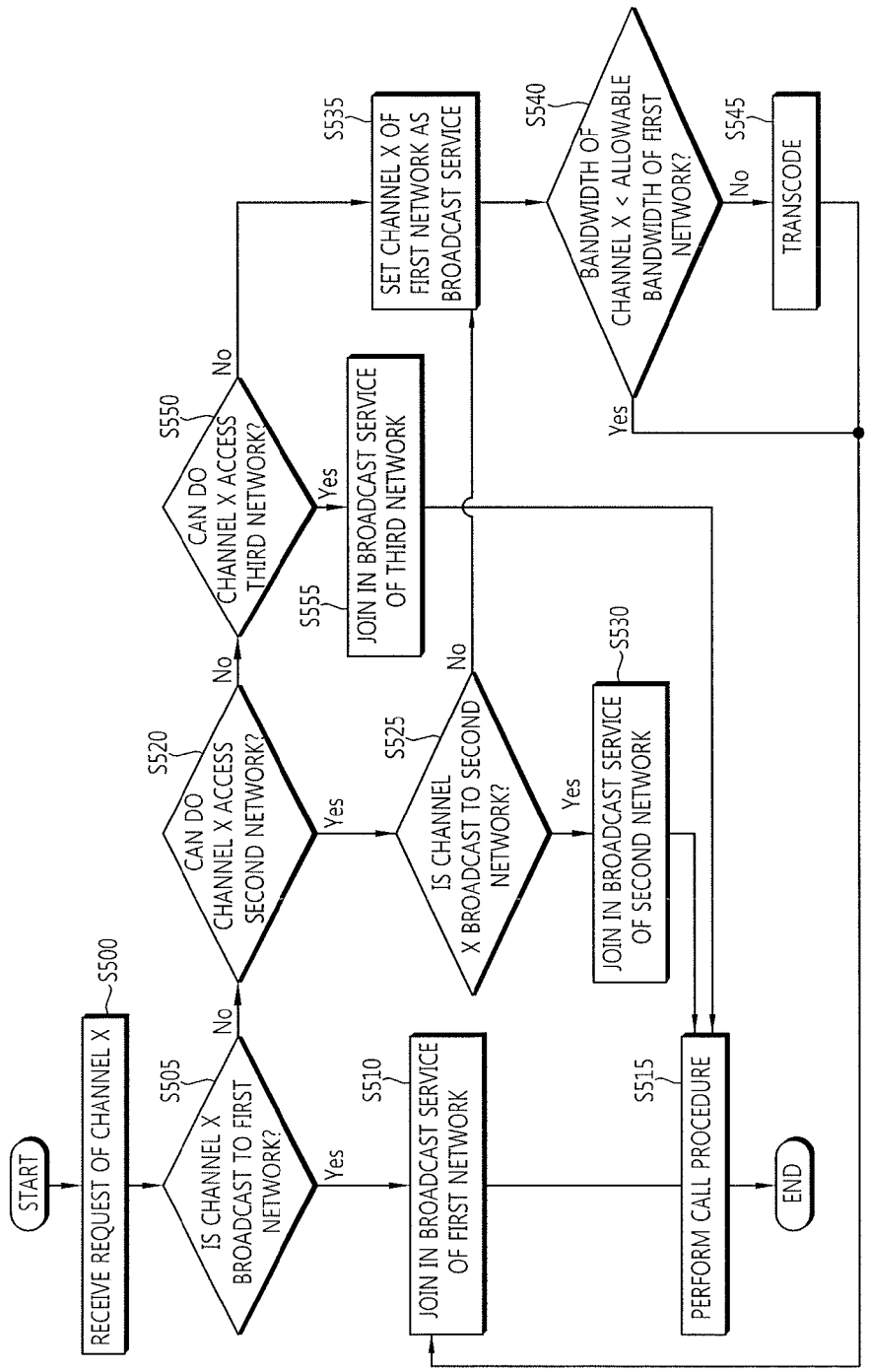
FIG. 5 is a flow chart showing an example of an initial procedure for configuring the overlay broadcast network according to the exemplary embodiment of the present invention.

FIG. 5 is a flow chart showing an example of an initial procedure for configuring the overlay broadcast network according to the exemplary embodiment of the present invention.

Referring to FIG. 5, the terminal may access one of the heterogeneous radio access network, a first network, a second network, and a third network.

When the terminal accessing the first network receives a request for a broadcast channel X (S500), a terminal determines whether a broadcast channel X is broadcast through the first network (S505).

When the broadcast channel X is broadcast from the first network, the terminal joins in the broadcast service of the first network (S510) and performs a call procedure process for broadcast services (S515).

When the broadcast channel X is not broadcast from the first network, it is determined whether the terminal can access the second network (S520).

If it is determined that the terminal accesses the second network, the terminal determines whether the broadcast channel X is broadcast from the second network (S525).

If it is determined that the broadcast channel X is broadcast from the second network, the terminal joins in the broadcast service of the second network (S530) and performs a call procedure process for broadcast services (S515).

If it is determined that the broadcast channel X is not broadcast from the second network, the terminal sets the channel X of the first network as the broadcast service (S535) and it is determined whether the required transmission rate of the channel X is allowed in the first network (S540). That is, it is determined whether a bandwidth of the channel X is smaller than an allowable bandwidth of the first network.

When a required bandwidth of the broadcast program is smaller than a bandwidth allowable in the first network, the terminal joins in the broadcast service of the first network (S510) and performs a call procedure process for broadcast services (S515).

When the required bandwidth of the broadcast program is not smaller than the bandwidth allowable in the first network, the terminal performs the transcoding (S545). Alternatively, when the transmission rate of the broadcast contents required by the terminal and the transmission rate that can be provided in the radio access network selected by the terminal are different from each other, the terminal performs the transcoding.

Thereafter, the terminal joins in the broadcast service of the first network (S510) and performs the call procedure process for broadcast services (S515).

If it is determined that the terminal cannot access the second network, the terminal determines whether the broadcast channel X is broadcast from the third network (S550).

If it is determined that the broadcast channel X is broadcast from the third network, the terminal joins in the broadcast service of the third network (S555) and performs the call procedure process for broadcast services (S515).

If it is determined that the broadcast channel X is not broadcast from the third network, the terminal sets the channel X of the first network as the broadcast service (S535) and it is determined whether the required transmission rate of the channel X is allowed in the first network (S540).

When a required bandwidth of the broadcast program is smaller than a bandwidth allowable in the first network, the terminal joins in the broadcast service of the first network (S510) and performs a call procedure process for broadcast services (S515).

When the required bandwidth of the broadcast program is not smaller than the bandwidth allowable in the first network, the terminal performs the transcoding (S545), joins in the broadcast service of the first network (S510) and performs the call procedure process for broadcast services (S515).

Figure 6:
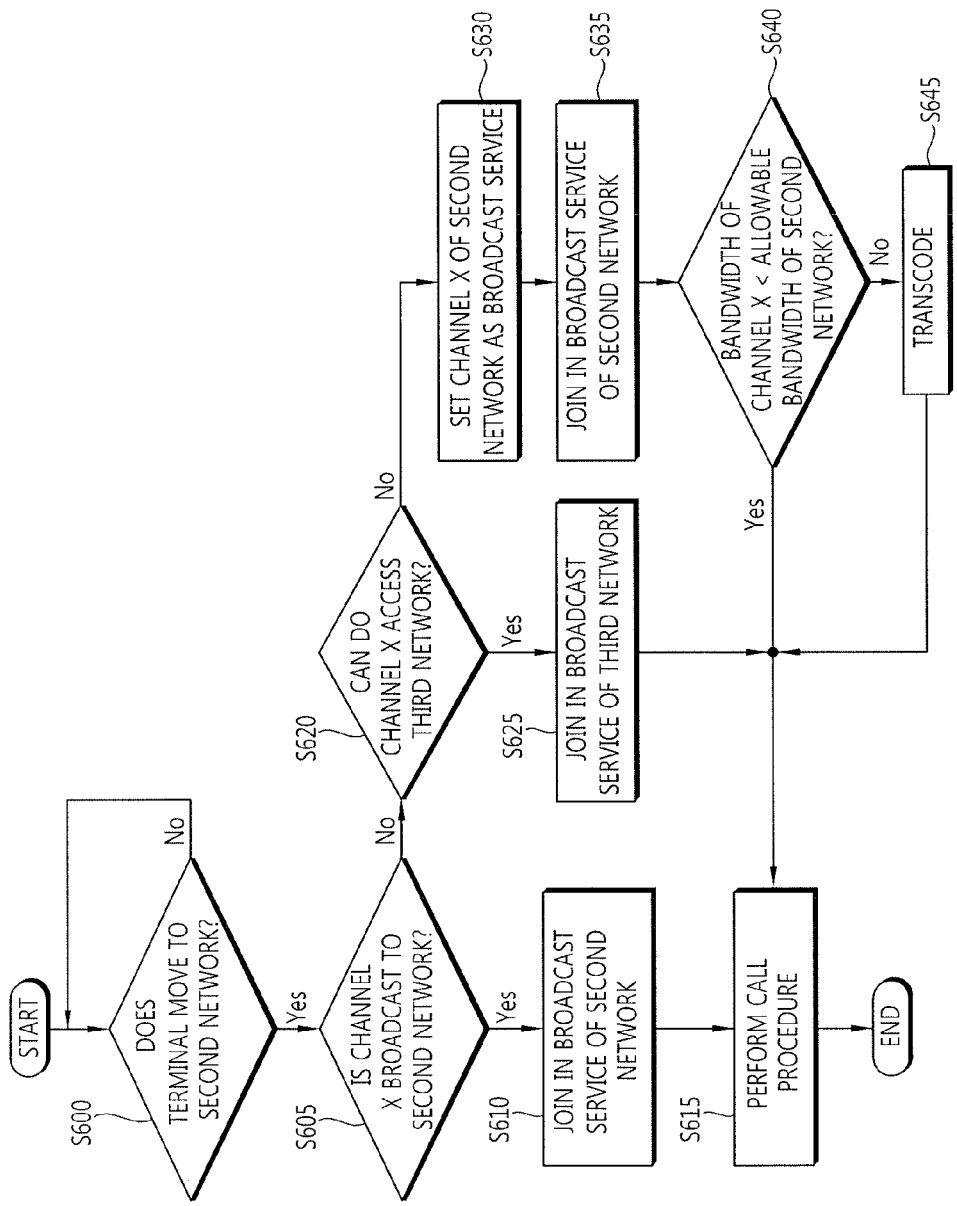
FIG. 6 is a flow chart of a mobility support procedure of the overlay network according to the exemplary embodiment of the present invention.

FIG. 6 is a flow chart of a mobility support procedure of the overlay broadcast network according to the exemplary embodiment of the present invention.

Referring to FIG. 6, the terminal moves to one of the heterogeneous radio access network, the first network, the second network, and the third network.

When the terminal accessing the first network to receive the multimedia media service of the channel X moves to the second network (S600), it is determined whether the channel X is broadcast from the second network (S605).

If it is determined that the channel X is broadcast from the second network, the terminal joins in the broadcast service of the second network (S610) and performs the call procedure process for broadcast services (S615).

If it is determined that the channel X is not broadcast from the second network, it is determined whether the channel X is broadcast from the third network (S620).

If it is determined that the channel X is broadcast from the third network, the terminal joins in the broadcast service of the third network (S625) and performs the call procedure process for broadcast services (S615).

If it is determined that the channel X is not broadcast from the third network, the channel X of the second network is set as the broadcast service (S630) and then, the terminal joins in the broadcast service of the second network (S635) and it is analyzed whether the required transmission rate of the channel X is allowable in the second network (S640). That is, it is determined that the bandwidth of the channel X is smaller than the allowable bandwidth of the second network.

If it is determined that the bandwidth allowable in the radio access network is smaller than the required bandwidth of the broadcast program, the transcoding is performed (S645) and then, the call procedure process for broadcast services is performed (S615).

If it is determined that the bandwidth allowable in the network is not smaller than the required bandwidth of the broadcast program, the call procedure process for broadcast services is performed (S615).

According to the exemplary embodiments of the present invention, it is possible to secure a technology for distributing the load distribution of traffic, securing the broadcast quality by reducing the interference signals, transmitting the multi-screen contents by configuring the overlay broadcast network integrating and using each radio access network under the environment in which various radio access networks are present.

According to the exemplary embodiments of the present invention, it is possible to increase the frequency use efficiency of the overall radio access network.

According to the exemplary embodiments of the present invention, it is possible to save the broadcast communication costs of the user due to the introduction of a virtual mobile communication network provider.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The spirit of the present invention has been just exemplified. It will be appreciated by those skilled in the art that various modifications and alterations can be made without departing from the essential characteristics of the present invention. Accordingly, the embodiments disclosed in the present invention and the accompanying drawings are used not to limit but to describe the spirit of the present invention. The scope of the present invention is not limited only to the embodiments. The protection scope of the present invention must be analyzed by the appended claims and it should be analyzed that all spirits within a scope equivalent thereto are included in the appended claims of the present invention.

What is claimed is:

1. An apparatus for configuring overlay broadcast network, comprising: an overlay broadcast server that receives broadcast contents information from a contents server, receives traffic information from a plurality of heterogeneous radio access networks, and configures an overlay broadcast network by overlaying the plurality of heterogeneous radio access networks based on the broadcast contents information and the traffic information,
    wherein the overlay broadcast server includes a contents synchronization frame generator that adds synchronization signals so as to simultaneously transmit the broadcast contents information in each radio access network configuring the overlay broadcast network.

2. The apparatus of claim 1, wherein the overlay broadcast server transmits the broadcast contents information to a terminal through the overlay broadcast network by controlling a router.

3. The apparatus of claim 1, wherein the traffic information includes at least one of radio resource allocation information, available radio resource information, and interference information.

4. The apparatus of claim 1, wherein the plurality of heterogeneous radio access networks are configured of a combination of all or a part of a 3rd Generation Partnership Project/Long Term Evolution (3GPP/LTE) network, a Wibro/Mobile WiMax network, an IMT-Advanced Wibro network, and a WiFi network.

5. The apparatus of claim 1, wherein a size of a cell of the overlay broadcast network is dynamically changed.

6. The apparatus of claim 1, wherein the overlay broadcast server includes a broadcast contents divider that divides the broadcast contents information in the least common multiple unit of each radio access network configuring the overlay broadcast network.

7. The apparatus of claim 6, wherein the overlay broadcast server transmits the divided broadcast contents information to a terminal through the overlay broadcast network.

8. The apparatus of claim 1, wherein the overlay broadcast server includes a transcoder that performs transcoding when a transmission rate of broadcast contents required in a terminal and a transmission rate provided from the radio access network selected by the terminal are different from each other.

9. A method for broadcasting contents in a radio access network, comprising: configuring an overlay broadcast network by overlaying all or a part of a plurality of heterogeneous radio access networks based on broadcast contents information received from a contents server and traffic information received from the plurality of heterogeneous radio access networks; and broadcasting the contents information to a terminal through the overlay broadcast network,
    wherein the broadcast contents information is divided and transmitted in the least common multiple unit of transmission frames of the plurality of heterogeneous radio access networks.

10. The method of claim 9, further comprising: comparing an allowable bandwidth of the plurality of heterogeneous radio access networks with a required bandwidth of contents required by the terminal, wherein the broadcast contents information is transmitted by performing transcoding when the allowable bandwidth of the plurality of heterogeneous radio access networks is smaller than a required bandwidth of contents required by the terminal.

11. The method of claim 10, further comprising: after the performing of the transcoding, performing a call procedure process for broadcast services.

12. The method of claim 9, wherein a size of a cell of the overlay broadcast network is dynamically changed.

13. The method of claim 9, wherein the plurality of heterogeneous radio access networks are configured of a combination of all or a part of a 3rd Generation Partnership Project/Long Term Evolution (3GPP/LTE) network, a Wibro/Mobile WiMax network, an IMT-Advanced Wibro network, and a WiFi network.

14. The method of claim 9, wherein the traffic information includes at least one of radio resource allocation information, available radio resource information, and interference information.

15. An overlay broadcast network system, comprising: a plurality of heterogeneous radio access networks that are configured of a combination of all or a part of a 3rd Generation Partnership Project/Long Term Evolution (3GPP/LTE) network, Wibro/Mobile WiMax network, an IMT-Advanced Wibro network, and a WiFi network; and an overlay broadcast server that receives broadcast contents information from a contents server, receives traffic information from the plurality of heterogeneous radio access networks, and configures an overlay broadcast network by overlaying the plurality of heterogeneous radio access networks based on the broadcast contents information and the traffic information.

* * * * *